United States Patent
Hirai et al.

(10) Patent No.: US 12,534,631 B2
(45) Date of Patent: Jan. 27, 2026

(54) PRE-COATED METAL SHEET

(71) Applicant: NIPPON STEEL CORPORATION, Tokyo (JP)

(72) Inventors: Akiko Hirai, Tokyo (JP); Kunihiko Toshin, Tokyo (JP); Yasuaki Kawamura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 163 days.

(21) Appl. No.: 18/283,989

(22) PCT Filed: Mar. 25, 2022

(86) PCT No.: PCT/JP2022/014585
§ 371 (c)(1),
(2) Date: Sep. 25, 2023

(87) PCT Pub. No.: WO2022/203063
PCT Pub. Date: Sep. 29, 2022

(65) Prior Publication Data
US 2024/0158651 A1  May 16, 2024

(30) Foreign Application Priority Data
Mar. 25, 2021 (JP) .................. 2021-051427

(51) Int. Cl.
| C09D 5/00 | (2006.01) |
| C09D 7/61 | (2018.01) |
| C09D 7/65 | (2018.01) |
| C09D 133/06 | (2006.01) |
| C09D 167/00 | (2006.01) |
| C23C 2/06 | (2006.01) |
| C23C 2/40 | (2006.01) |

(52) U.S. Cl.
CPC .................. *C09D 7/65* (2018.01); *C09D 5/00* (2013.01); *C09D 7/61* (2018.01); *C09D 133/06* (2013.01); *C09D 167/00* (2013.01); *C23C 2/06* (2013.01); *C23C 2/40* (2013.01)

(58) Field of Classification Search
None
See application file for complete search history.

(56) References Cited

U.S. PATENT DOCUMENTS

| 8,592,049 B2 * | 11/2013 | Honda ..................... C21D 9/46 428/641 |
| 2017/0137946 A1 | 5/2017 | Ariyoshi et al. |
| 2020/0032399 A1 | 1/2020 | Shibao et al. |

FOREIGN PATENT DOCUMENTS

| JP | 2004-209720 A | 7/2004 |
| JP | 2012-121020 A | 6/2012 |

(Continued)

*Primary Examiner* — Daniel J. Schleis
(74) *Attorney, Agent, or Firm* — Birch, Stewart, Kolasch & Birch, LLP

(57) ABSTRACT

In order to achieve further improvement in flaw resistance, the present invention includes: a metal sheet; and a color film layer positioned on the metal sheet, wherein: on a surface, of the metal sheet, on a side on which at least the color film layer is positioned, a first region and a second region that are specified by a measuring method of an arithmetic mean surface roughness Sa are present; and the color film layer has a thickness of 1 to 10 μm, and contains particles having a particle diameter equal to or larger than the thickness.

16 Claims, 3 Drawing Sheets

(56) References Cited

FOREIGN PATENT DOCUMENTS

| | | | |
|---|---|---|---|
| JP | 2012121323 A * | 6/2012 | |
| WO | WO 2008/078562 A1 | 7/2008 | |
| WO | WO 2014/112544 A1 | 7/2014 | |

* cited by examiner

PRE-COATED METAL SHEET

TECHNICAL FIELD

The present invention relates to a pre-coated metal sheet.

BACKGROUND ART

For home appliances, building materials, automobiles, or the like, in place of conventional post-painted products painted after molding work, an organic resin-covered plated steel sheet (also called a pre-coated steel sheet.) in which a surface layer of a zinc-based plated steel sheet is covered with an organic resin film is being used. This pre-coated steel sheet, in which a steel sheet treated for rust prevention or a plated steel sheet is covered with a colored organic film, has characteristics of having beauty, and at the same time having workability and good corrosion resistance. This organic resin-covered plated steel sheet is subjected to press working, and then is often used as materials for the home appliances, the building materials, the automobiles, and the like without being further painted, or the like. Thus, to prevent the beauty from disappearing during the working, such an organic resin-covered plated steel sheet is required to have excellent flaw resistance. Accordingly, to improve the characteristics including the flaw resistance of the pre-coated steel sheet, various techniques are conventionally proposed.

For example, in Patent Document 1 below, a technique of providing a color paint film containing two kinds of particles having predetermined average particle diameters and a color pigment on at least one side of a metal sheet is proposed.

PRIOR ART DOCUMENT

Patent Document

Patent Document 1: Japanese Laid-open Patent Publication No. 2012-121020

DISCLOSURE OF THE INVENTION

Problems to be Solved by the Invention

However, in the technique disclosed in Patent Document 1 described above, the flaw resistance is obtained by containing spherical silica particles having an average particle diameter of 5 to 50 nm in a color film having a film thickness of 2 to 10 µm, and in this technique, resistance to such a scratch as is evaluated by pencil hardness is obtained, but resistance to such a surface contact flaw as is caused by rubbing sheet surfaces against each other is insufficient, which still leaves room for improvement.

Thus, the present invention has been made in consideration of the above-described problems, and an object of the present invention is to provide a pre-coated metal sheet in which the resistance to the surface contact flaw is improved as further improvement in flaw resistance.

Means for Solving the Problems

To solve the above-described problems, the present inventors have made intensive studies, resulting in hitting on an idea that bringing a surface roughness of a pre-coated metal sheet to a desired state and containing particles having a specified particle diameter allow further improvement in flaw resistance with respect to surface contact, and they have completed the present invention.

The gist of the present invention completed based on such an idea is as follows.

(1) A pre-coated metal sheet includes: a metal sheet; and a color film layer positioned on the metal sheet, wherein: on a surface, of the metal sheet, on a side on which at least the color film layer is positioned, a first region and a second region that are specified by a following measuring method of an arithmetic mean surface roughness Sa are present; and the color film layer has a thickness of 1 to 10 µm, and contains particles having a particle diameter equal to or larger than the thickness.

[Measuring Method of Arithmetic Mean Surface Roughness Sa]

On the surface of the metal sheet, virtual grid lines are set at intervals of 0.5 mm, and in each of a plurality of regions into which the surface is divided by the virtual grid lines, the arithmetic mean surface roughness Sa specified by ISO 25178 is measured. The region in which the obtained arithmetic mean surface roughness Sa is 1 µm or more is set as the first region, and the region in which the obtained arithmetic mean surface roughness Sa is less than 1 µm is set as the second region.

(2) The pre-coated metal sheet according to (1), wherein an area ratio of the first region to the surface of the metal sheet is 10 to 90% per side.

(3) The pre-coated metal sheet according to (1) or (2), wherein a ratio of the area ratio of the first region to an area ratio of the second region is 0.3 to 3.0.

(4) The pre-coated metal sheet according to any one of (1) to (3), wherein a content of the particles in the color film layer is 5 to 50 mass % with respect to a total content of a film-forming component and the particles of the color film layer.

(5) The pre-coated metal sheet according to any one of (1) to (4), wherein an average particle diameter of the particles is 1 to 15 µm.

(6) The pre-coated metal sheet according to any one of (1) to (5), wherein the average particle diameter of the particles is 0.3 to 2.5 times the thickness of the color film layer.

(7) The pre-coated metal sheet according to any one of (1) to (6), wherein the particle is at least either an inorganic particle of at least any of silica, ceramic, and a metallic compound, or, a resin particle.

(8) The pre-coated metal sheet according to any one of (1) to (7), wherein the particle is an acrylic-based resin particle.

(9) The pre-coated metal sheet according to any one of (1) to (8), wherein the metal sheet is an aluminum sheet, a zinc sheet, a stainless sheet, a titanium sheet, or a steel sheet.

(10) The pre-coated metal sheet according to any one of (1) to (9), wherein the metal sheet is a plated steel sheet in which a plating layer is provided on a surface.

(11) The pre-coated metal sheet according to (10), wherein the plated steel sheet is a zinc-based plated steel sheet.

(12) The pre-coated metal sheet according to (10) or (11), wherein the plating layer is a plating layer containing Al: 4 to 22 mass %, Mg: 1 to 10 mass %, Si: 0.0001 to 2.0000 mass %, and the balance being Zn and impurities.

(13) The pre-coated metal sheet according to any one of (10) to (12), wherein a weight of the plating layer is 30 to 600 g/m² in total on both sides of the steel sheet.

(14) The pre-coated metal sheet according to any one of (1) to (13), wherein the color film layer contains at least any of an aluminum pigment, carbon black, and $TiO_2$ as a color pigment.

(15) The pre-coated metal sheet according to any one of (1) to (14), wherein the color film layer further contains a rust preventive pigment.

(16) The pre-coated metal sheet according to any one of (1) to (15), further includes a chemical treatment film layer between the metal sheet and the color film layer.

Effect of the Invention

According to the present invention as explained above, it becomes possible to further improve the flaw resistance with respect to the surface contact.

EMBODIMENTS FOR CARRYING OUT THE INVENTION

Hereinafter, preferred embodiments of the present invention will be explained in detail with reference to the attached drawings. Note that in the present description and the drawings, constituent elements having substantially the same functional configurations are denoted by the same codes to omit overlapped explanation.

(Regarding Pre-Coated Metal Sheet)

Figure 1A:
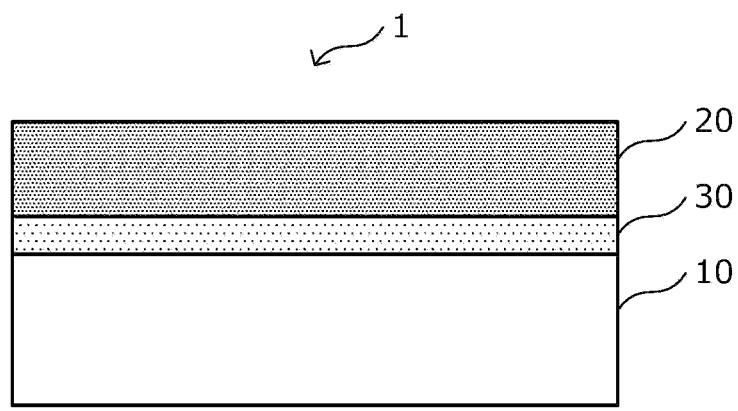
FIG. 1A is an explanatory view schematically illustrating a structure of a pre-coated metal sheet according to an embodiment of the present invention.
Figure 1B:
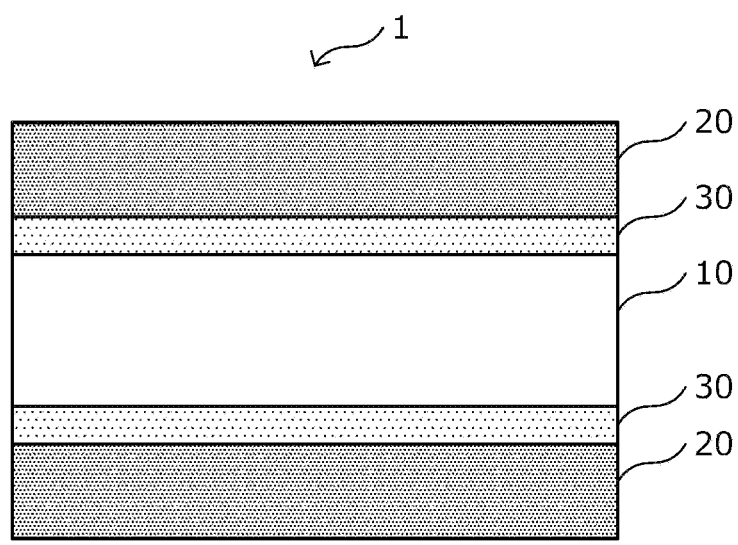
FIG. 1B is an explanatory view schematically illustrating a structure of the pre-coated metal sheet according to the same embodiment.

In the following, a pre-coated metal sheet according to the embodiment of the present invention will be explained in detail with reference to FIG. 1A and FIG. 1B. FIG. 1A and FIG. 1B are each an explanatory view schematically illustrating a structure of the pre-coated metal sheet according to this embodiment.

As schematically illustrated in FIG. 1A, a pre-coated metal sheet 1 according to this embodiment has a metal sheet 10 serving as a base material and a color film layer 20 positioned on one side of the metal sheet 10. Further, as illustrated in FIG. 1A, it is preferable to further have a chemical treatment film layer 30 between the metal sheet 10 and the color film layer 20.

Further, such color film layer 20 and chemical treatment film layer 30 may be provided on both sides of the metal sheet 10 as schematically illustrated in FIG. 1B.

<Regarding the Metal Sheet 10>

Regarding the metal sheet used as the base material, various metal sheets can be used depending on mechanical strength or the like required for the pre-coated metal sheet 1. As such a metal sheet, there can be cited, for example, an aluminum sheet, a zinc sheet, a stainless sheet, a titanium sheet, a steel sheet, or the like.

Further, the thickness of the metal sheet 10 according to this embodiment only needs to be also appropriately set according to the mechanical strength or the like required for the pre-coated metal sheet 1, and can be set to about 0.2 mm to 10.0 mm, for example.

Further, when the steel sheet is used as the metal sheet 10, there can be used various steel sheets such as, for example, Al-killed steel, ultralow carbon steel containing Ti, Nb, and the like, and high-strength steel further containing strengthening elements such as P, Si, and Mn in the ultralow carbon steel.

Further, a plated steel sheet in which various plating layers are formed on a surface of the steel sheet may be used. In this case, as the type of plating formed on the steel sheet, for example, zinc-based plating is simply employed. As such zinc-based plating, there can be cited, for example, hot-dip galvanizing, electrogalvanizing, zinc-nickel alloy plating, alloying hot-dip galvanizing, aluminum-zinc alloy plating, zinc-aluminum-magnesium alloy plating, zinc-vanadium composite plating, zinc-zirconium composite plating, or the like.

In such zinc-based plating, in particular, the zinc-aluminum-magnesium alloy plating is preferable, and zinc-aluminum-magnesium-silicon alloy plating containing Al: 4 to 22 mass %, Mg: 1 to 10 mass %, Si: 0.0001 to 2.0000 mass %, and the balance being Zn and impurities is more preferable.

[Al: 4 to 22 Mass %]

By setting the content of Al to 4 mass % or more and 22 mass % or less, the corrosion resistance of the steel sheet improves. When the content of Al is less than 4 mass %, the corrosion resistance may decrease. The content of Al is preferably 5 mass % or more. On the other hand, when the content of Al exceeds 22 mass %, the effect of improving the corrosion resistance of the plating layer may be saturated. The content of Al is preferably 16 mass % or less.

[Mg: 1 to 10 Mass %]

By setting the content of Mg to 1 mass % or more and 10 mass % or less, the corrosion resistance of the steel sheet improves. When the content of Mg is less than 1 mass %, the effect of improving the corrosion resistance of the steel sheet may become insufficient. The content of Mg is preferably 2 mass % or more. On the other hand, when the content of Mg exceeds 10 mass %, dross generation in a plating bath may become significant, which may make it difficult to stably produce a hot-dip plated steel sheet. The content of Mg is preferably 5 mass % or less.

[Si: 0.0001 to 2.0000 Mass %]

By setting the content of Si to 0.0001 mass % or more and 2.0000 mass % or less, the adhesion of the plating layer can be ensured. When the content of Si exceeds 2.0000 mass %, the effect of improving the adhesion of the plating layer may be saturated. The content of Si is more preferably 1.6000 mass % or less.

Further, in the plating layer according to this embodiment, 1 mass % or less of elements such as Fe, Sb, and Pb may be contained alone or in combination in place of a part of Zn of the balance.

As the plated steel sheet provided with the plating layer having the chemical composition as described above, there can be cited, for example, such a hot-dip zinc-aluminum-magnesium-silicon alloy plated steel sheet as a plated steel sheet including a Zn-11% Al-3% Mg-0.2% Si alloy plating layer (for example, "SuperDyma (registered trademark)" manufactured by Nippon Steel Corporation), or the like.

The plating layer as explained above can be manufactured as follows, for example. First, pretreatments such as washing and degreasing are performed on the surface of the prepared steel sheet as necessary. Thereafter, the steel sheet pretreated as necessary is immersed in a hot-dip plating bath having desired chemical components, and pulled up from such a plating bath. In such plating operation, plating may be performed by either a continuous plating method for coils or a plating method for cut sheets alone.

The temperature of the hot-dip plating bath is different depending on its composition, and for example, preferably in a range of 400 to 500° C.

Further, a weight of plating as described above can be controlled by a pulling-up speed of the steel sheet, a flow rate of a wiping gas ejected from a wiping nozzle provided above the plating bath, a flow velocity adjustment, and the like. The weight of the plating is preferably 30 g/m² or more in total on both sides of the steel sheet (that is, 15 g/m² or more per side). When the weight is less than 30 g/m², the corrosion resistance may decrease, which is unpreferable. The weight of the plating is more preferably 40 g/m² or more. On the other hand, the weight of the plating is preferably 600 g/m² or less in total on both the sides of the steel sheet (that is, 300 g/m² or less per side). When the weight exceeds 600 g/m², molten metal adhering to the steel sheet may drip to prevent a surface of a hot-dip plating layer from being smoothed, which in unpreferable. The weight of the plating layer is more preferably 550 g/m² or less in total on both the sides of the steel sheet. After adjusting the weight of the hot-dip plating layer, the steel sheet is cooled. At this time, cooling conditions need not be particularly limited.

<<Regarding Surface Shape of the Metal Sheet 10>>

Figure 2:
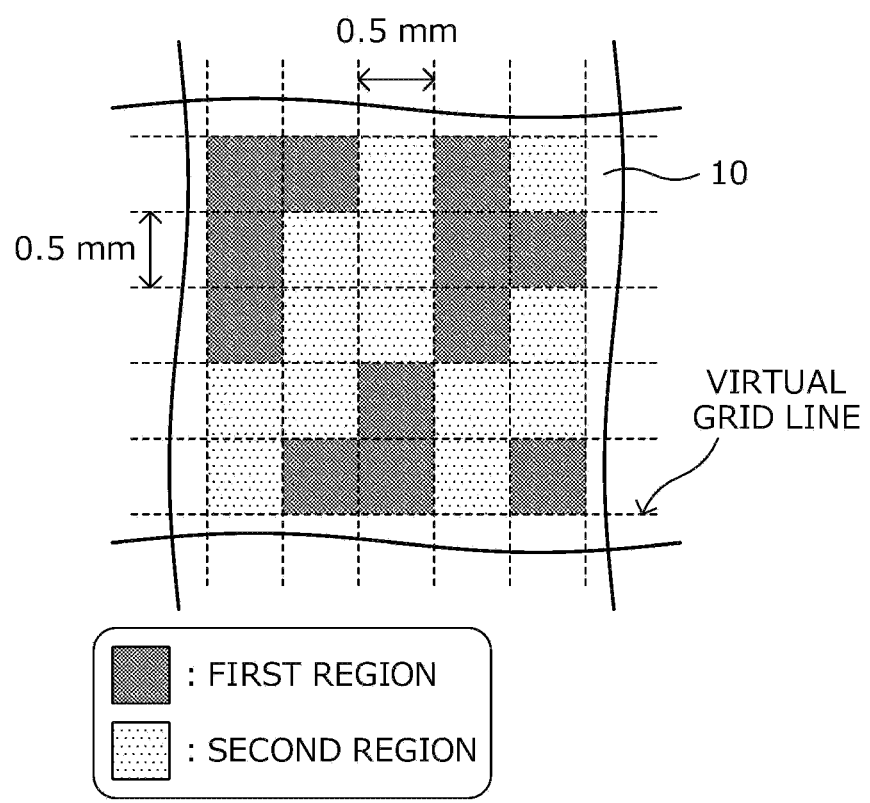
FIG. 2 is an explanatory view for explaining a surface shape of a metal sheet in the pre-coated metal sheet according to the same embodiment.

Next, a surface shape of the metal sheet 10 in the pre-coated metal sheet 1 according to this embodiment will be explained in detail with reference to FIG. 2. FIG. 2 is an explanatory view for explaining the surface shape of the metal sheet in the pre-coated metal sheet according to this embodiment.

In the metal sheet 10 according to this embodiment, on a surface on a side on which the color film layer 20 is positioned, a first region and a second region that are specified by the following measuring method of an arithmetic mean surface roughness Sa are present.

<<Measuring Method of Arithmetic Mean Surface Roughness Sa>>

On the surface of the metal sheet 10, as schematically illustrated in FIG. 2, virtual grid lines are set at intervals of 0.5 mm, and in each of a plurality of regions into which the surface is divided by the virtual grid lines, the arithmetic mean surface roughness Sa specified by ISO 25178 is measured using a surface roughness meter. The region in which the obtained arithmetic mean surface roughness Sa is 1 μm or more is set as the first region, and the region in which the obtained arithmetic mean surface roughness Sa is less than 1 μm is set as the second region. Note that when a film is already present, the paint film is removed by rubbing with gauze impregnated with an organic solvent (for example, MEK (methyl ethyl ketone) or the like), and thereafter the above-described roughness can be measured. Note that when the plated steel sheet in which the plating layer is formed is used as the metal sheet 10, the arithmetic mean surface roughness Sa as described above is measured on a surface of the plating layer.

In the above-described measuring method, the measurement of the arithmetic mean surface roughness Sa is carried out with a 3D laser microscope (manufactured by KEYENCE CORPORATION). In this embodiment, with a standard lens at a magnification of 20 times, in each of the plurality of regions into which the surface is divided by the virtual grid lines, heights A in each of the regions are measured at measurement intervals of 50 μm. For the measurement on a grid, 100 measurement points (81 measurement points in the region+19 points on two sides of grid lines of an outer frame of the region) are obtained in the region. When the obtained heights A at 100 points are set as a height $A_1$ to a height $A_{100}$, Sa is calculated using the following formula. $A_{ave}$ is set as an average of the heights A at the 100 points.

$$Sa=1/100\times\Sigma[x=1\to 100](|\text{height } A_x - A_{ave}|)$$

The first region specified by the measurement as described above can also be considered as an uneven portion on the surface of the metal sheet 10, and the second region specified by the measurement as described above can also be considered as a flat portion on the surface of the metal sheet 10. In addition to the presence of two kinds of the regions as described above on the surface of the metal sheet 10, particles present in the color film layer 20 have particle diameters as described later, and thereby the particles in the color film layer 20 are fixed by such a second region, which prevents the particles from moving and falling out. Of the fixed particles, as described later, ones having a larger particle diameter than a thickness of the color film layer 20 are present. As a result, the resistance of the pre-coated metal sheet 1 to the surface contact flaw improves.

Here, an upper limit value of the arithmetic mean surface roughness Sa in the first region is not particularly specified, but when the arithmetic mean surface roughness Sa exceeds the thickness of the color film layer, the color film layer becomes partially thin, and thereby the corrosion resistance may decrease. Thus, the arithmetic mean surface roughness Sa in the first region is preferably equal to or less than the thickness of the color film layer. Further, a lower limit value of the arithmetic mean surface roughness Sa in the second region is not particularly specified, but the value as small as possible is preferred, and setting it to less than 0.05 μm often causes difficulty in manufacturing. Accordingly, the lower limit value of the arithmetic mean surface roughness Sa in the second region is substantially about 0.05 μm.

An area ratio of the first region to the surface of the metal sheet 10 is preferably 10% or more per side. The area ratio of the first region per side is 10% or more, thereby reducing an area of a thin portion in the film in the first region, which allows still further improvement in the corrosion resistance. The area ratio of the first region is more preferably 20% or more, and still more preferably 30% or more per side. Meanwhile, the area ratio of the first region to the surface of the metal sheet 10 is preferably 90% or less per side. The area ratio of the first region per side is 90% or less, thereby allowing still further improvement in the resistance to surface contact flaw. The area ratio of the first region to the surface of the metal sheet 10 is more preferably 80% or less, and still more preferably 70% or less.

A ratio of the area ratio of the first region to an area ratio of the second region is preferably 0.3 or more, and more preferably 0.4 or more. Further, the ratio of the area ratio of the first region to the area ratio of the second region is preferably 3.0 or less, and more preferably 2.5 or less. The ratio of the area ratios is in the above-described range, thereby allowing more secure fixing of the particles of the color film layer 20, which allows still further improvement in the resistance to surface contact flaw.

Note that the surface shape as explained above may be achieved by performing physical or chemical surface treatment (for example, surface polishing, surface grinding, chemical etching, and so on) on the focused surface of the metal sheet 10, or may be already achieved on the surface of the metal sheet 10 without performing the surface treatment as a result of producing the metal sheet 10. Note that when the surface treatment achieves the surface shape as described above, adjusting conditions of the surface treatment allows control of the area ratio of the first region as described above.

<Regarding the color film layer 20>

Figure 3:
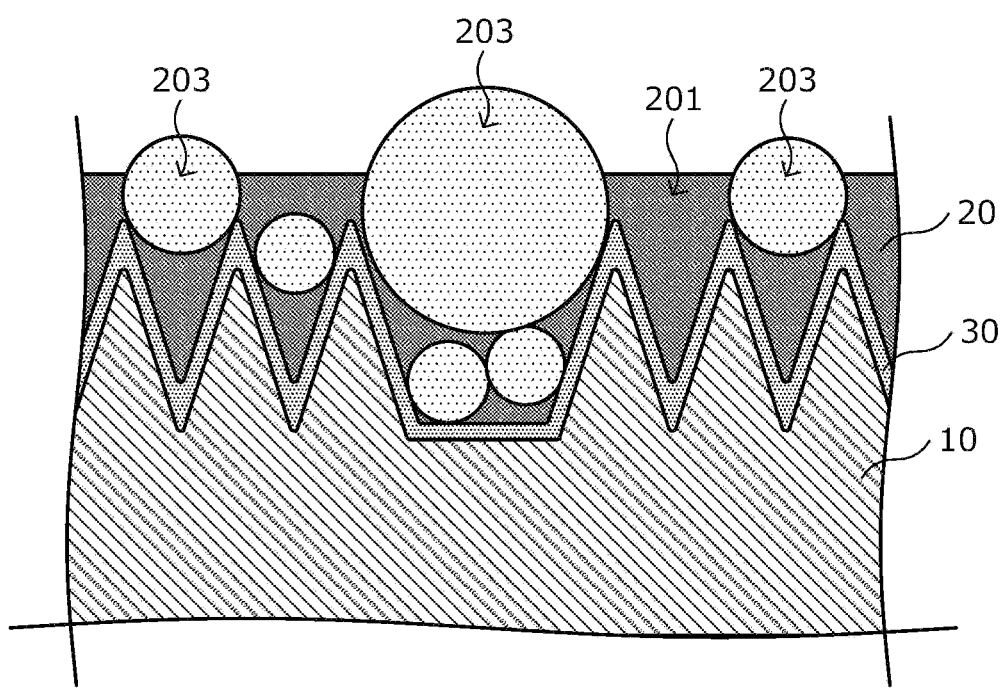
FIG. 3 is an explanatory view for explaining a color film layer in the pre-coated metal sheet according to the same embodiment.

In the following, the color film layer 20 included in the pre-coated metal sheet according to this embodiment will be explained with reference to FIG. 3. FIG. 3 is an explanatory view for explaining the color film layer 20 included in the pre-coated metal sheet according to this embodiment.

The color film layer 20 is a film layer colored a desired color by having a color pigment. As schematically illustrated in FIG. 3, such a color film layer 20 contains a film-forming component 201 and particles 203, and at least a part of such particles 203 has a particle diameter equal to or larger than the thickness of the color film layer 20. In other words, such particles 203 have variations in particle diameter such that at least a part of the particle diameters is equal to or larger than the thickness of the color film layer 20. By providing the color film layer 20 containing the particles having the particle diameter equal to or larger than the thickness of the color film layer 20, the unevenness present on the surface of the metal sheet 10 functions as walls preventing the particles 203 from moving physically, thereby limiting the movement of the particles 203, resulting in fixing the particles 203. Further, when the color film layer 20 comes into contact with some surface, the presence of the particles 203 protruding from the surface of the color film layer 20 results in not overall contact with the color film layer 20 but contact with the particles 203 (in other words, the contact with some surface results in not surface contact with the whole of the color film layer 20 but point contact with the particles 203 protruding from the color film layer 20). This allows improvement in flaw resistance (in more detail, resistance to surface contact flaw) of the pre-coated metal sheet 1 according to this embodiment. Note that in FIG. 3, the presence of protrusions on the surface of the metal sheet 10 is illustrated, and the same can also be said of the presence of depressions on the surface of the metal sheet 10.

In the pre-coated metal sheet 1 according to this embodiment, the thickness of such a color film layer 20 is 1 µm or more. The color film layer 20 with a thickness of less than 1 µm fails to exhibit desired flaw resistance. The thickness of the color film layer 20 is preferably 2 µm or more, and more preferably 3 µm or more. On the other hand, the thickness of the color film layer 20 is 10 µm or less. When the thickness of the color film layer 20 exceeds 10 µm, a paint film defect such as solvent popping, in addition to an increase in cost, may occur, which may make it difficult to obtain a stable external appearance. The thickness of the color film layer 20 is preferably 8 µm or less, and more preferably 7 µm or less.

Note that the thickness of such a color film layer 20 can be measured by cross-section observation. The thicknesses are measured at an optional plurality of positions (for example, ten positions), and an average value of the obtained plurality of thicknesses only needs to be set as the thickness of the color film layer 20. Further, the presence of the particles 203 having the particle diameter equal to or larger than the thickness of the color film layer 20 can also be confirmed by such cross-section observation.

In the color film layer 20 according to this embodiment, the content of the particles 203 is preferably 5 mass % or more with respect to the total content of the film-forming component 201 and the particles 203. This allows still further improvement in the flaw resistance. The content of the particles 203 in the color film layer 20 is more preferably 10 mass % or more. Meanwhile, the content of the particles 203 is 50 mass % or less with respect to the total content of the film-forming component 201 and the particles 203. This allows still further improvement in the flaw resistance. When the content of the particles 203 is more than 50 mass %, a proportion for which the film-forming component accounts in the color film decreases to lower a barrier property as the film, which makes it difficult to exhibit desired corrosion resistance. The content of the particles 203 in the color film layer 20 is more preferably 45 mass % or less.

As the film-forming component 201 of the color film layer 20 according to this embodiment, any material can be used as long as it functions as a binder of the particles 203, and from the viewpoint of simplicity and cost effectiveness in manufacturing, various organic resins are preferably used. As such a film-forming component 201, there can be cited, for example, an acrylic-based resin, a polyester-based resin, a urethane-based resin, a fluorine-based resin, and so on. Further, as the particles 203, for use of resin particles using an organic resin as a material, the same kind of resin as such resin particles is preferably selected as the film-forming component 201. This improves an affinity between the film-forming component 201 and the particles 203, which allows further improvement in the adhesion of the color film layer 20.

The particle 203 of the color film layer 20 according to this embodiment is preferably at least either an inorganic particle of at least any of silica, ceramic, and a metallic compound, or, the resin particle using the organic resin as the material. Among them, the use of the resin particle allows toughness and expandability included in the resin particle to alleviate an impact applied to the color film layer 20, which allows still further improvement in the flaw resistance. As such a resin particle, there can be cited an acrylic-based resin particle, a polyester-based resin particle, a urethane-based resin particle, a fluorine-based resin particle, a silicon resin particle, a polyolefin-based resin particle, and so on, and the acrylic-based resin particle is more preferably used. Further, the color pigment itself contained in the color film layer 20 may function as the particle 203 as described above.

In this embodiment, as the particles 203, the ones having the larger particle diameter than the thickness of the color film layer 20 are present, and an average particle diameter of them is preferably 1 to 15 µm. The particles 203 have the average particle diameter as described above, thereby allowing still further improvement in the flaw resistance of the pre-coated metal sheet.

Here, the average particle diameter of the particles 203 can be measured by a direct observation from a cross section. Specifically, after burying the painted metal sheet perpendicularly to the paint film thickness direction in a room temperature drying type epoxy resin, and subjecting the buried surface to mechanical polishing, the observation is carried out with a SEM (scanning electron microscope). At this time, particle diameters of the particles 203 observed at an optional plurality of positions (for example, ten positions) are measured, and an average value of the obtained plurality of particle diameters only needs to be set as the average particle diameter of the particles 203.

Further, it is preferable that such particles 203 have the larger particle diameter than the film thickness, and the average particle diameter is 0.3 to 2.5 times the thickness of the color film layer 20. The average particle diameter of the particles 203 and the thickness of the color film layer 20 have the relation as described above, thereby allowing still further improvement in the flaw resistance of the pre-coated metal sheet.

Note that the color pigment contained in the color film layer 20 is not particularly limited, but various well-known pigments can be appropriately used depending on color tones required for the color film layer 20. As such a color pigment, for example, an aluminum pigment, carbon black, $TiO_2$, or the like can be cited. Further, the content thereof only needs to be also appropriately set, and to be, for example, about 3 to 60 mass %.

Such a color film layer 20 can be formed in a manner in which a paint component containing the components forming the color film layer 20 as described above is applied on the surface of the metal sheet 10, on the plating surface, on the surface of the metal sheet 10 having the chemical treatment film layer 30, or on the plating surface having the chemical treatment film layer 30, and thereafter baked at a temperature of 150° C. or more and less than 300° C. to be cured and dried. When the baking temperature is less than 150° C., bake hardening may be insufficient, resulting in decreases in the corrosion resistance and the flaw resistance of the paint film, and when the baking temperature is 300° C. or more, thermal degradation of the resin component may occur, resulting in a decrease in the workability.

Incidentally, the application of the paint component as described above can be performed by generally well-known coating methods, for example, roll coating, curtain flow coating, air spray, airless spray, immersion, bar coating, brush coating, or the like.

Further, the color film layer 20 can further contain an additive such as a rust preventive pigment, surface-modified metal powder or glass powder, a dispersing agent, a leveling agent, wax, or an aggregate, a diluting solvent, or the like as necessary within a range that does not impair the above-described effect.

Here, when the rust preventive pigment is contained, the content thereof is preferably set to 1 to 15 mass %, for example. Further, as the rust preventive pigment to be used, various well-known rust preventive pigments can be used.

<Regarding the Chemical Treatment Film Layer 30>

The chemical treatment film layer 30 according to this embodiment is a film layer that can be positioned between the metal sheet 10 and the color film layer 20, and is a layer formed by a chemical treatment after removing impurities such as oil and surface oxides adhering to the surface of the metal sheet 10 by a well-known degreasing step and washing step.

As the detailed composition of the chemical treatment film layer 30 according to this embodiment, there can be cited, for example, the composition containing any one or more selected from the group consisting of resin, a silane coupling agent, a zirconium compound, silica, phosphoric acid and its salt, fluoride, a vanadium compound, and tannin or tannic acid. Containing these substances further improves the film formability obtained after applying a chemical treatment solution, the barrier property (denseness) of the film against corrosion factors such as moisture and corrosive ions, the film adhesion to the plated surface, and the like, resulting in contribution to the improvement in the corrosion resistance of the film.

In particular, when the chemical treatment film layer 30 contains one or more of a silane coupling agent and a zirconium compound, a crosslinked structure is formed within the chemical treatment film layer 30, which also strengthens bonding with the plated surface, thus allowing further improvement in the adhesion and the barrier property of the film.

Further, when the chemical treatment film layer 30 contains any one or more of silica, phosphoric acid and its salt, fluoride, and a vanadium compound, these substances function as inhibitors and form a precipitation film or passive film on the plating or steel surface, thereby allowing further improvement in the corrosion resistance.

In the following, there will be explained details of each component that can be contained in the chemical treatment film layer 30 as described above with reference to examples.

[Resin]

As the resin, without being particularly limited, well-known organic resins such as a polyester resin, a polyurethane resin, an epoxy resin, a phenol resin, an acrylic resin, and a polyolefin resin, for example, can be used. To further improve the adhesion to the plated steel sheet for pre-coated steel sheet, it is preferable to use at least one of the resins (polyester resin, urethane resin, epoxy resin, acrylic resin, and so on) having a forced site or polar functional group in a molecular chain. The resins may be used alone or in combination of two or more resins.

The content of the resin in the chemical treatment film layer 30 is preferably 0 mass % or more and more preferably 1 mass % or more with respect to the solid content of the film, for example. Further, the content of the resin in the chemical treatment film layer 30 is preferably 85 mass % or less, more preferably 60 mass % or less, and still more preferably 40 mass % or less with respect to the solid content of the film, for example. When the content of the resin exceeds 85 mass %, the ratio of the other film components may decrease and the performance required as the film other than the corrosion resistance may decrease.

[Silane Coupling Agent]

As the silane coupling agent, there can be cited, for example, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl) aminopropylmethyldiethoxysilane, γ-(2-aminoethyl)aminopropylmethyldimethoxysilane, γ-methacryloxypropyltrimethoxysilane, γ-methacryloxypropylmethyldimethoxysilane, γ-methacryloxypropyltriethoxysilane, γ-methacryloxypropylmethyldiethoxysilane, N-β-(N-vinylbenzylaminoethyl)-γ-aminopropyltrimethoxysilane, N-β-(N-vinylbenzylaminoethyl)-γ-aminopropylmethyldimethoxysilane, N-β-(N-vinylbenzylaminoethyl)-γ-aminopropyltriethoxysilane, N-β-(N-vinylbenzylaminoethyl)-γ-aminopropylmethyldiethoxysilane, γ-glycidoxypropyltrimethoxysilane, γ-glycidoxypropylmethyldimethoxysilane, γ-glycidoxypropyltriethoxysilane, γ-glycidoxypropylmethyldiethoxysilane, γ-mercaptopropyltrimethoxysilane, γ-mercaptopropylmethyldimethoxysilane, γ-mercaptopropyltriethoxysilane, γ-mercaptopropylmethyldiethoxysilane, methyltrimethoxysilane, dimethyldimethoxysilane, methyltriethoxysilane, dimethyldiethoxysilane, vinyltriacetoxysilane, γ-chloropropyltrimethoxysilane, γ-chloropropylmethyldimethoxysilane, γ-chloropropyltriethoxysilane, γ-chloropropylmethyldiethoxysilane, hexamethyldisilazane, γ-anilinopropyltrimethoxysilane, γ-anilinopropylmethyldimethoxysilane, γ-anilinopropyltriethoxysilane, γ-anilinopropylmethyldiethoxysilane, vinyltrimethoxysilane, vinylmethyldimethoxysilane, vinyltriethoxysilane, vinylmethyldiethoxysilane, octadecyldimethyl[3-(trimethoxysilyl)propyl]ammonium chloride, octadecyldimethyl[3-(methyldimethoxysilyl)propyl]ammonium chloride, octadecyldimethyl[3-(triethoxysilyl)propyl]ammonium chloride, octadecyldimethyl[3-(methyldiethoxysilyl)propyl]ammonium chloride, γ-chloropropylmethyldimethoxysilane, γ-mercaptopropylmethyldimethoxysilane, methyltrichlorosilane, dimethyldichlorosilane, trimethylchlorosilane, and so on. The added amount of the silane coupling agent in a chemical treatment agent for forming the chemical treatment film layer 30 can be, for example, 2 to 80 g/L. When the added amount of the silane coupling agent is less than 2 g/L, the adhesion to the plated surface may be insufficient, leading to a decrease in the work adhesion of the paint film. Further, when the added amount of the silane coupling agent exceeds 80 g/L, the cohesive force of the chemical treatment film layer may be insufficient, leading to a decrease in the work adhesion of the paint film layer. The silane coupling agents as described as examples above may be used alone or in combination of two or more.

[Zirconium Compound]

As the zirconium compound, there can be cited, for example, zirconium normal propylate, zirconium normal butyrate, zirconium tetraacetylacetonate, zirconium monoacetylacetonate, zirconium bisacetylacetonate, zirconium monoethylacetoacetate, zirconium acetylacetonate bisethylacetoacetate, zirconium acetate, zirconium monostearate, zirconium carbonate, zirconium ammonium carbonate, potassium zirconium carbonate, sodium zirconium carbonate, and so on. The added amount of the zirconium compound in the chemical treatment agent for forming the chemical treatment film layer 30 can be, for example, 2 to 80 g/L. When the added amount of the zirconium compound is less than 2 g/L, the adhesion to the plated surface may be insufficient, leading to a decrease in the work adhesion of the paint film. Further, when the added amount of the zirconium compound exceeds 80 g/L, the cohesive force of the chemical treatment film layer may be insufficient, leading to a decrease in the work adhesion of the paint film. Such zirconium compounds may be used alone or in combination of two or more.

[Silica]

As the silica, there can be used, for example, commercially available silica gels such as "SNOWTEX N", "SNOWTEX C", "SNOWTEX UP", and "SNOWTEX PS" manufactured by Nissan Chemical Corporation, and "ADELITE AT-20Q" manufactured by ADEKA CORPORATION, or, powdered silica such as AEROSIL #300 manufactured by NIPPON AEROSIL CO., LTD., or ones equivalent to these pieces of commercially available silica. Silica can be appropriately selected according to the required performance of the pre-coated plated steel sheet. The added amount of the silica in the chemical treatment agent for forming the chemical treatment film layer 30 is preferably set to, for example, 1 to 40 g/L. When the added amount of the silica is less than 1 g/L, the work adhesion of the film layer may decrease, and when the added amount of the silica exceeds 40 g/L, the effects of work adhesion and corrosion resistance are likely to be saturated, which is uneconomical.

[Phosphoric Acid and its Salt]

As the phosphoric acid and its salt, there can be cited, for example, phosphoric acids such as orthophosphoric acid, metaphosphoric acid, pyrophosphoric acid, triphosphoric acid, and tetraphosphoric acid and salts thereof, ammonium salts such as triammonium phosphate and diammonium hydrogen phosphate, phosphonic acids such as aminotri(methylenephosphonic acid), 1-hydroxyethylidene-1,1-diphosphonic acid, ethylenediaminetetra(methylenephosphonic acid), and diethylenetriaminepenta(methylenephosphonic acid) and salts thereof, organic phosphoric acids such as phytic acid and salts thereof, and so on. Incidentally, as salts of phosphoric acid other than ammonium salts, there can be cited metal salts with Na, Mg, Al, K, Ca, Mn, Ni, Zn, Fe, and so on. The phosphoric acid and its salt may be used alone or in combination of two or more.

Incidentally, the content of the phosphoric acid and its salt is preferably 0 mass % or more and more preferably 1 mass % or more with respect to the solid content of the film, for example. Further, the content of the phosphoric acid and its salt is preferably 20 mass % or less and more preferably 10 mass % or less with respect to the solid content of the film, for example. When the content of the phosphoric acid and its salt exceeds 20 mass %, the film becomes brittle and the work followability of the film may decrease when the pre-coated plated steel sheet is molded.

[Fluoride]

As the fluoride, there can be cited, for example, ammonium zirconium fluoride, ammonium silicofluoride, ammonium titanium fluoride, sodium fluoride, potassium fluoride, calcium fluoride, lithium fluoride, titanium hydrofluoride, zirconium hydrofluoride, and so on. Such fluorides may be used alone or in combination of two or more.

Incidentally, the content of the fluoride is preferably 0 mass % or more and more preferably 1 mass % or more with respect to the solid content of the film, for example. Further, the content of the fluoride is preferably 20 mass % or less and more preferably 10 mass % or less with respect to the solid content of the film, for example. When the content of the fluoride exceeds 20 mass %, the film becomes brittle and the work followability of the film may decrease when the pre-coated metal sheet is molded.

[Vanadium Compound]

As the vanadium compound, there can be cited, for example, vanadium compounds obtained by reducing pentavalent vanadium compounds such as vanadium pentoxide, metavanadic acid, ammonium metavanadate, sodium metavanadate, and vanadium oxytrichloride to 2 to 4 valences with a reducing agent, vanadium compounds with oxidation numbers of 4 to 2 valences, such as vanadium trioxide, vanadium dioxide, vanadium oxysulfate, vanadium oxyoxalate, vanadium oxyacetylacetonate, vanadium acetylacetonate, vanadium trichloride, phosphovanadomolybdic acid, vanadium sulfate, vanadium dichloride, and vanadium oxide, and so on. Such vanadium compounds may be used alone or in combination of two or more.

Incidentally, the content of the vanadium compound is preferably 0 mass % or more and more preferably 1 mass % or more with respect to the solid content of the film, for example. Further, the content of the vanadium compound is preferably 20 mass % or less and more preferably 10 mass % or less with respect to the solid content of the film, for example. When the content of the vanadium compound exceeds 20 mass %, the film becomes brittle and the work followability of the film may decrease when the pre-coated metal sheet is molded.

[Tannin or Tannic Acid]

As the tannin or tannic acid, hydrolyzable tannin and condensed tannin both can be used. As examples of tannin and tannic acid, there can be cited hamamelitannin, gall tannin, gallnut tannin, myrobalan tannin, divi-divi tannin, algarovilla tannin, valonia tannin, catechin, and so on. The added amount of the tannin or tannic acid in the chemical treatment agent for forming the chemical treatment film layer 30 can be set to 2 to 80 g/L. When the added amount of the tannin or tannic acid is less than 2 g/L, the adhesion to the plated surface may be insufficient, leading to a decrease in the work adhesion of the paint film. Further, when the added amount of the tannin or tannic acid exceeds 80 g/L, the cohesive force of the chemical treatment film may be insufficient, leading to a decrease in the work adhesion of the paint film.

Further, an acid, an alkali, or the like may be added to the chemical treatment agent for forming the chemical treatment film layer 30 in order to adjust pH within a range that does not impair the performance.

The chemical treatment agent containing various components as described above is applied to one side or both sides of the metal sheet 10, and then dried to form the chemical treatment film layer 30. In the pre-coated metal sheet according to this embodiment, it is preferable to form the chemical treatment film layer 30 of 10 mg/m² or more per side on the plating layer. The weight of the chemical treatment film layer 30 is more preferably 20 mg/m² or more and most preferably 50 mg/m² or more. Further, in the pre-coated metal sheet according to this embodiment, it is preferable to form the chemical treatment film layer 30 of 1000 mg/m² or less per side on the plating layer. The weight of the chemical treatment film layer 30 is more preferably 800 mg/m² or less and still more preferably 600 mg/m² or less. Incidentally, a film thickness of the chemical treatment film layer 30 corresponding to such a weight is approximately 0.01 to 1 µm, depending on the components contained in the chemical treatment agent. Incidentally, such a film thickness of the chemical treatment film layer 30 can be measured by the direct observation of the cross section similarly to the measuring method of the average particle diameter of the particles 203.

EXAMPLES

Hereinafter, the pre-coated metal sheet according to the present invention will be specifically explained while describing examples and comparative examples. Incidentally, the examples described below are merely examples of the pre-coated metal sheet according to the present invention, and the pre-coated metal sheet according to the present invention is not limited to the following examples.

(1) Metal Sheet Seven kinds of metal sheets of A1 to A7, presented in Table 1 below, were prepared. To obtain surface shapes presented in Table 7-1, Table 7-2, a resin shot or surface polishing was performed on the prepared metal sheets under working conditions as described in Table 2. Note that the surface shapes were analyzed and determined by the following method. Further, plating weights of A1 to A4 were set as the weights presented in Table 7-1 and Table 7-2 below. Moreover, plated steel sheets obtained by performing chromate-free chemical treatment (equivalent to CT-E300/manufactured by NIHON PARKERIZING CO., LTD.) in 60 mg/m² on these metal sheets were also prepared. A treatment solution used for the chemical treatment contains a silane coupling agent as its component, and a film layer formed by such chemical treatment functions as a chemical treatment film layer. Note that the presence/absence of the chemical treatment was described in Table 7-1 and Table 7-1 below.

TABLE 1

| TYPE | METAL SHEET |
|------|-------------|
| A1 | HOT-DIP Zn—11%Al—3%Mg—0.2%Si PLATED STEEL SHEET |
| A2 | ALLOYED HOT-DIP GALVANIZED STEEL SHEET (Fe: 10%) |
| A3 | HOT-DIP GALVANIZED STEEL SHEET |
| A4 | HOT-DIP Al—9%Si PLATED STEEL SHEET |
| A5 | SUS SHEET (FERRITIC STAINLESS STEEL SHEET) |
| A6 | STEEL SHEET |
| A7 | ZINC SHEET |

TABLE 2

| | METHOD | PRESSURIZING FORCE (MPa) | SHOT DISTANCE (cm) | SHOT TIME (sec) |
|---|---|---|---|---|
| A | RESIN SHOT | 0.1 | 20 | 5 |
| B | RESIN SHOT | 0.2 | 20 | 5 |
| C | RESIN SHOT | 0.3 | 20 | 5 |
| D | RESIN SHOT | 0.4 | 20 | 5 |
| E | RESIN SHOT | 0.5 | 20 | 5 |
| F | RESIN SHOT | 0.6 | 20 | 5 |
| G | RESIN SHOT | 0.6 | 10 | 10 |
| H | RESIN SHOT | 0.1 | 30 | 5 |
| I | RESIN SHOT | 0.1 | 30 | 4 |
| J | RESIN SHOT | 0.1 | 30 | 3 |
| K | RESIN SHOT | 0.1 | 30 | 2 |
| L | RESIN SHOT | 0.1 | 30 | 1 |
| M | SURFACE POLISHING | — | — | — |

<Surface Shape of Metal Sheet>

With the use of the metal sheet after forming a color film layer, the color film layer was removed by rubbing the color film layer with gauze impregnated with MEK. Thereafter, an area ratio of a first region of the metal sheet was calculated by the following method. On a surface of the metal sheet, virtual grid lines were drawn at intervals of 0.5 mm, and a plurality of regions into which the surface was divided by the virtual grid lines were set to calculate an arithmetic mean surface roughness Sa of each of the regions. Then, the region having the arithmetic mean surface roughness Sa of 1 µm or more was distinguished as the first region, and the region having the arithmetic mean surface roughness A of less than 1 µm was distinguished as a second region. The measurement of the arithmetic mean surface roughness Sa was carried out with a 3D laser microscope (manufactured by KEYENCE CORPORATION, VK-9710). With a standard lens at a magnification of 20 times, in each of the plurality of regions into which the surface is divided by the virtual grid lines, heights A in each of the regions were measured at measurement intervals of 50 μm. The obtained heights A at 100 points were set as a height $A_1$ to a height $A_{100}$, and Sa was calculated using the following formula. $A_{ave}$ was set as an average of the heights A at 100 points.

$$Sa = 1/100 \times \Sigma[x=1 \to 100](|\text{height } A_x - A_{ave}|)$$

(2) Blending for Color Paint

Color paints to be used for formation of the color film layers were prepared.

As binder resins each functioning as a film-forming component, ones equivalent to resins presented in Table 3 below were prepared. To each of resin solutions, a melamine-based curing agent (one equivalent to CYMEL 303/ manufactured by Allnex Co., Ltd.) was added as a curing agent in a solid content percentage of 15 mass %. Moreover, ones equal to particles presented in Table 4 below were prepared, and added with predetermined particle diameters and in predetermined contents presented in Table 7-1 and Table 7-2 below. Further, as color pigments, ones equivalent to an aluminum pigment, titanium oxide, and carbon black (CB), presented in Table 5 below, were prepared, and added in predetermined amounts presented in Table 7-1 and Table 7-2 below. Further, as rust preventive pigments, compounds presented in Table 6 below were prepared, and added in predetermined amounts presented in Table 7-1 and Table 7-2 below, and the color paints were prepared.

TABLE 3

| TYPE | BINDER RESIN |
|---|---|
| B1 | "ALMATEX E208" MANUFACTURED BY MITSUI CHEMICALS, INC. (AQUEOUS ACRYLIC RESIN) |
| B2 | "ALMATEX E255" MANUFACTURED BY MITSUI CHEMICALS, INC. (AQUEOUS ACRYLIC RESIN) |
| B3 | "MD-2000" MANUFACTURED BY TOYOBO CO., LTD. (AQUEOUS POLYESTER RESIN) |
| B4 | MIXTURE OF B1 AND B3 AT 1:1 (mass %) |

TABLE 4

| TYPE | PARTICLE |
|---|---|
| C1 | "SSX-101" MANUFACTURED BY SEKISUI KASEI CO., LTD. (ACRYLIC RESIN PARTICLE, AVERAGE PARTICLE DIAMETER 1 μm) |
| C2 | "MZ-5HN" MANUFACTURED BY SOKEN CHEMICAL & ENGINEERING CO., LTD. (ACRYLIC RESIN PARTICLE, AVERAGE PARTICLE DIAMETER 5 μm) |
| C3 | "BM30X-8" MANUFACTURED BY SEKISUI KASEI CO., LTD. (ACRYLIC RESIN PARTICLE, AVERAGE PARTICLE DIAMETER 8 μm) |
| C4 | "MZ-10HN" MANUFACTURED BY SOKEN CHEMICAL & ENGINEERING CO., LTD. (ACRYLIC RESIN PARTICLE, AVERAGE PARTICLE DIAMETER 10 μm) |
| C5 | "MZ-12H" MANUFACTURED BY SOKEN CHEMICAL & ENGINEERING CO., LTD. (ACRYLIC RESIN PARTICLE, AVERAGE PARTICLE DIAMETER 12 μm) |
| C6 | "HPS-0500" MANUFACTURED BY TOAGOSEI CO., LTD. (SILICA PARTICLE, AVERAGE PARTICLE DIAMETER 0.5 μm) |
| C7 | "SFP-30M" MANUFACTURED BY DENKA COMPANY LIMITED (SILICA PARTICLE, AVERAGE PARTICLE DIAMETER 0.6 μm) |
| C8 | "HPS-1000" MANUFACTURED BY TOAGOSEI CO., LTD. (SILICA PARTICLE, AVERAGE PARTICLE DIAMETER 1 μm) |
| C9 | "HS-311" MANUFACTURED BY NIPPON STEEL CHEMICAL & MATERIAL CO., LTD. (SILICA PARTICLE, AVERAGE PARTICLE DIAMETER 2.2 μm) |
| C10 | "HS-207" MANUFACTURED BY NIPPON STEEL CHEMICAL & MATERIAL CO., LTD. (SILICA PARTICLE, AVERAGE PARTICLE DIAMETER 9.5 μm) |
| C11 | "HS-206" MANUFACTURED BY NIPPON STEEL CHEMICAL & MATERIAL CO., LTD. (SILICA PARTICLE, AVERAGE PARTICLE DIAMETER 12 μm) |
| C12 | "FB-940" MANUFACTURED BY DENKA COMPANY LIMITED (SILICA PARTICLE, AVERAGE PARTICLE DIAMETER 15.2 μm) |
| C13 | "HS-308" MANUFACTURED BY NIPPON STEEL CHEMICAL & MATERIAL CO., LTD. (SILICA PARTICLE, AVERAGE PARTICLE DIAMETER 17 μm) |
| C14 | "TOSPEARL 120" MANUFACTURED BY NISSHO SANGYO CO., LTD. (SILICONE RESIN PARTICLE, AVERAGE PARTICLE DIAMETER 2 μm) |
| C15 | "CHEMIPEARL W800" MANUFACTURED BY MITSUI CHEMICALS, INC. (POLYOLEFIN RESIN PARTICLE, AVERAGE PARTICLE DIAMETER 8 μm) |
| C16 | "CB-P10" MANUFACTURED BY SHOWA DENKO (ALUMINA PARTICLE, AVERAGE PARTICLE DIAMETER 8 μm) |
| C17 | "CGB-8R" MANUFACTURED BY NIPPON GRAPHITE INDUSTRIES, CO., LTD. (GRAPHITE PARTICLE, AVERAGE PARTICLE DIAMETER 8 μm) |

TABLE 5

| TYPE | COLOR PIGMENT |
|---|---|
| D1 | "Sap 561PS" MANUFACTURED BY SHOWA ALUMINUM POWDER CO., LTD. |
| D2 | TITANIUM OXIDE "R-780" MANUFACTURED BY ISHIHARA SANGYO KAISHA, LTD. |
| D3 | CARBON BLACK "MCF #850" MANUFACTURED BY MITSUBISHI CHEMICAL CORPORATION |
| D4 | MIXTURE OF D2 AND D3 AT 3:1 (mass %) |
| D5 | "AF BLUE E-2B" MANUFACTURED BY DAINICHISEIKA COLOR & CHEMICALS MFG. CO., LTD. |

TABLE 6

| TYPE | RUST PREVENTIVE PIGMENT |
|---|---|
| E1 | ALUMINUM DIHYDROGEN TRIPOLYPHOSPHATE |
| E2 | CALCIUM VANADATE |
| E3 | MIXTURE OF E1 AND E2 AT 1:1 (mass %) |

(3) Sample Production

The color paints prepared as described above were applied to the plated steel sheets with a bar coater, and the applied plated steel sheets were heated so as to reach a peak metal temperature (PMT) of 200° C. in 60 seconds, thereby forming the color film layers. Note that thicknesses of the produced color film layers were measured by the cross-section observation in line with the method explained in advance, and the obtained results were presented in Table 7-1, Table 7-2.

TABLE 7-1

| | BASESHEET | | | | | | | COLOR FILM LAYER | | |
|---|---|---|---|---|---|---|---|---|---|---|
| | | TOTAL PLATING WEIGHT ON BOTH SIDES (g/m$^2$) | | SURFACE SHAPE | | | | | | |
| | | | | | AREA | | | | | |
| | TYPE | | WORKING METHOD | AREA OF FIRST REGION (%) | AREA OF SECOND REGION (%) | RATIO OF FIRST/ SECOND REGIONS | CHEMICAL TREAT- MENT | FILM THICK- NESS (μm) | TYPE OF BINDER RESIN | TYPE OF PARTICLE |
| EXAMPLE 1 | A1 | 100 | A | 50 | 50 | 1.0 | PRESENCE | 4.0 | B1 | C3 |
| EXAMPLE 2 | A2 | 100 | A | 50 | 50 | 1.0 | PRESENCE | 4.0 | B1 | C3 |
| EXAMPLE 3 | A3 | 100 | A | 50 | 50 | 1.0 | PRESENCE | 4.0 | B1 | C3 |
| EXAMPLE 4 | A4 | 100 | A | 50 | 50 | 1.0 | PRESENCE | 4.0 | B1 | C3 |
| EXAMPLE 5 | A5 | — | F | 50 | 50 | 1.0 | PRESENCE | 4.0 | B1 | C3 |
| EXAMPLE 6 | A6 | — | D | 50 | 50 | 1.0 | PRESENCE | 4.0 | B1 | C3 |
| EXAMPLE 7 | A7 | — | A | 50 | 50 | 1.0 | PRESENCE | 4.0 | B1 | C3 |
| EXAMPLE 8 | A1 | 10 | A | 50 | 50 | 1.0 | PRESENCE | 4.0 | B1 | C3 |
| EXAMPLE 9 | A1 | 30 | A | 50 | 50 | 1.0 | PRESENCE | 4.0 | B1 | C3 |
| EXAMPLE 10 | A1 | 300 | A | 50 | 50 | 1.0 | PRESENCE | 4.0 | B1 | C3 |
| EXAMPLE 11 | A1 | 600 | A | 50 | 50 | 1.0 | PRESENCE | 4.0 | B1 | C3 |
| EXAMPLE 12 | A1 | 700 | A | 50 | 50 | 1.0 | PRESENCE | 4.0 | B1 | C3 |
| EXAMPLE 13 | A1 | 100 | F | 92 | 8 | 11.5 | PRESENCE | 4.0 | B1 | C3 |
| EXAMPLE 14 | A1 | 100 | E | 90 | 10 | 9.0 | PRESENCE | 4.0 | B1 | C3 |
| EXAMPLE 15 | A1 | 100 | D | 80 | 20 | 4.0 | PRESENCE | 4.0 | B1 | C3 |
| EXAMPLE 16 | A1 | 100 | C | 75 | 25 | 3.0 | PRESENCE | 4.0 | B1 | C3 |
| EXAMPLE 17 | A1 | 100 | B | 70 | 30 | 2.3 | PRESENCE | 4.0 | B1 | C3 |
| EXAMPLE 18 | A1 | 100 | H | 30 | 70 | 0.4 | PRESENCE | 4.0 | B1 | C3 |
| EXAMPLE 19 | A1 | 100 | I | 25 | 75 | 0.3 | PRESENCE | 4.0 | B1 | C3 |
| EXAMPLE 20 | A1 | 100 | J | 20 | 80 | 0.3 | PRESENCE | 4.0 | B1 | C3 |
| EXAMPLE 21 | A1 | 100 | K | 10 | 90 | 0.1 | PRESENCE | 4.0 | B1 | C3 |
| EXAMPLE 22 | A1 | 100 | L | 8 | 92 | 0.1 | PRESENCE | 4.0 | B1 | C3 |
| EXAMPLE 23 | A1 | 100 | B | 70 | 30 | 2.3 | PRESENCE | 4.0 | B1 | C2 |
| EXAMPLE 24 | A1 | 100 | H | 30 | 70 | 0.4 | PRESENCE | 4.0 | B1 | C2 |
| EXAMPLE 25 | A1 | 100 | A | 50 | 50 | 1.0 | ABSENCE | 4.0 | B1 | C3 |
| EXAMPLE 26 | A1 | 100 | A | 50 | 50 | 1.0 | PRESENCE | 10.0 | B1 | C3 |
| EXAMPLE 27 | A1 | 100 | A | 50 | 50 | 1.0 | PRESENCE | 8.0 | B1 | C3 |
| EXAMPLE 28 | A1 | 100 | A | 50 | 50 | 1.0 | PRESENCE | 7.0 | B1 | C3 |
| EXAMPLE 29 | A1 | 100 | A | 50 | 50 | 1.0 | PRESENCE | 3.0 | B1 | C2 |
| EXAMPLE 30 | A1 | 100 | A | 50 | 50 | 1.0 | PRESENCE | 2.0 | B1 | C2 |
| EXAMPLE 31 | A1 | 100 | A | 50 | 50 | 1.0 | PRESENCE | 1.0 | B1 | C1 |
| EXAMPLE 32 | A1 | 100 | A | 50 | 50 | 1.0 | PRESENCE | 4.0 | B2 | C3 |
| EXAMPLE 33 | A1 | 100 | A | 50 | 50 | 1.0 | PRESENCE | 4.0 | B2 | C3 |
| EXAMPLE 34 | A1 | 100 | A | 50 | 50 | 1.0 | PRESENCE | 4.0 | B3 | C3 |
| EXAMPLE 35 | A1 | 100 | A | 50 | 50 | 1.0 | PRESENCE | 4.0 | B3 | C3 |
| EXAMPLE 36 | A1 | 100 | A | 50 | 50 | 1.0 | PRESENCE | 4.0 | B4 | C3 |
| EXAMPLE 37 | A1 | 100 | A | 50 | 50 | 1.0 | PRESENCE | 4.0 | B4 | C3 |
| EXAMPLE 38 | A1 | 100 | A | 50 | 50 | 1.0 | PRESENCE | 4.0 | B2 | C2 |
| EXAMPLE 39 | A1 | 100 | A | 50 | 50 | 1.0 | PRESENCE | 4.0 | B2 | C2 |
| EXAMPLE 40 | A1 | 100 | A | 50 | 50 | 1.0 | PRESENCE | 4.0 | B3 | C2 |
| EXAMPLE 41 | A1 | 100 | A | 50 | 50 | 1.0 | PRESENCE | 4.0 | B3 | C2 |

| | COLOR FILM LAYER | | | | | | | |
|---|---|---|---|---|---|---|---|---|
| | PARTICLE HAVING DIAMETER EQUAL TO OR LARGER THAN FILM THICKNESS | AVERAGE PARTICLE DIAMETER (μm) | AVERAGE PARTICLE DIAMETER/ FILM THICK- NESS | CONTENT OF PARTICLE (MASS %) | COLOR PIGMENT | AMOUNT OF COLOR PIGMENT (MASS %) | RUST PREVENTIVE PIGMENT | AMOUNT OF RUST PREVEN- TIVE PIGMENT (MASS %) |
| EXAMPLE 1 | PRESENCE | 8.0 | 2.0 | 30 | D4 | 15 | ABSENCE | 0 |
| EXAMPLE 2 | PRESENCE | 8.0 | 2.0 | 30 | D4 | 15 | ABSENCE | 0 |

TABLE 7-1-continued

| | | | | | | | | | |
|---|---|---|---|---|---|---|---|---|---|
| EXAMPLE 3 | PRESENCE | 8.0 | 2.0 | 30 | D4 | 15 | ABSENCE | 0 |
| EXAMPLE 4 | PRESENCE | 8.0 | 2.0 | 30 | D4 | 15 | ABSENCE | 0 |
| EXAMPLE 5 | PRESENCE | 8.0 | 2.0 | 30 | D4 | 15 | ABSENCE | 0 |
| EXAMPLE 6 | PRESENCE | 8.0 | 2.0 | 30 | D4 | 15 | ABSENCE | 0 |
| EXAMPLE 7 | PRESENCE | 8.0 | 2.0 | 30 | D4 | 15 | ABSENCE | 0 |
| EXAMPLE 8 | PRESENCE | 8.0 | 2.0 | 30 | D4 | 15 | ABSENCE | 0 |
| EXAMPLE 9 | PRESENCE | 8.0 | 2.0 | 30 | D4 | 15 | ABSENCE | 0 |
| EXAMPLE 10 | PRESENCE | 8.0 | 2.0 | 30 | D4 | 15 | ABSENCE | 0 |
| EXAMPLE 11 | PRESENCE | 8.0 | 2.0 | 30 | D4 | 15 | ABSENCE | 0 |
| EXAMPLE 12 | PRESENCE | 8.0 | 2.0 | 30 | D4 | 15 | ABSENCE | 0 |
| EXAMPLE 13 | PRESENCE | 8.0 | 2.0 | 30 | D4 | 15 | ABSENCE | 0 |
| EXAMPLE 14 | PRESENCE | 8.0 | 2.0 | 30 | D4 | 15 | ABSENCE | 0 |
| EXAMPLE 15 | PRESENCE | 8.0 | 2.0 | 30 | D4 | 15 | ABSENCE | 0 |
| EXAMPLE 16 | PRESENCE | 8.0 | 2.0 | 30 | D4 | 15 | ABSENCE | 0 |
| EXAMPLE 17 | PRESENCE | 8.0 | 2.0 | 30 | D4 | 15 | ABSENCE | 0 |
| EXAMPLE 18 | PRESENCE | 8.0 | 2.0 | 30 | D4 | 15 | ABSENCE | 0 |
| EXAMPLE 19 | PRESENCE | 8.0 | 2.0 | 30 | D4 | 15 | ABSENCE | 0 |
| EXAMPLE 20 | PRESENCE | 8.0 | 2.0 | 30 | D4 | 15 | ABSENCE | 0 |
| EXAMPLE 21 | PRESENCE | 8.0 | 2.0 | 30 | D4 | 15 | ABSENCE | 0 |
| EXAMPLE 22 | PRESENCE | 8.0 | 2.0 | 30 | D4 | 15 | ABSENCE | 0 |
| EXAMPLE 23 | PRESENCE | 5.0 | 1.3 | 30 | D4 | 15 | ABSENCE | 0 |
| EXAMPLE 24 | PRESENCE | 5.0 | 1.3 | 30 | D4 | 15 | ABSENCE | 0 |
| EXAMPLE 25 | PRESENCE | 8.0 | 2.0 | 30 | D4 | 15 | ABSENCE | 0 |
| EXAMPLE 26 | PRESENCE | 8.0 | 0.8 | 30 | D4 | 15 | ABSENCE | 0 |
| EXAMPLE 27 | PRESENCE | 8.0 | 1.0 | 30 | D4 | 15 | ABSENCE | 0 |
| EXAMPLE 28 | PRESENCE | 8.0 | 1.1 | 30 | D4 | 15 | ABSENCE | 0 |
| EXAMPLE 29 | PRESENCE | 5.0 | 1.7 | 30 | D4 | 15 | ABSENCE | 0 |
| EXAMPLE 30 | PRESENCE | 5.0 | 2.5 | 30 | D4 | 15 | ABSENCE | 0 |
| EXAMPLE 31 | PRESENCE | 1.0 | 1.0 | 30 | D4 | 15 | ABSENCE | 0 |
| EXAMPLE 32 | PRESENCE | 8.0 | 2.0 | 30 | D4 | 15 | ABSENCE | 0 |
| EXAMPLE 33 | PRESENCE | 8.0 | 2.0 | 30 | D4 | 15 | E3 | 5 |
| EXAMPLE 34 | PRESENCE | 8.0 | 2.0 | 30 | D4 | 15 | ABSENCE | 0 |
| EXAMPLE 35 | PRESENCE | 8.0 | 2.0 | 30 | D4 | 15 | E3 | 5 |
| EXAMPLE 36 | PRESENCE | 8.0 | 2.0 | 30 | D4 | 15 | ABSENCE | 0 |
| EXAMPLE 37 | PRESENCE | 8.0 | 2.0 | 30 | D4 | 15 | E3 | 5 |
| EXAMPLE 38 | PRESENCE | 5.0 | 1.3 | 30 | D4 | 15 | ABSENCE | 0 |
| EXAMPLE 39 | PRESENCE | 5.0 | 1.3 | 30 | D4 | 15 | E3 | 5 |
| EXAMPLE 40 | PRESENCE | 5.0 | 1.3 | 30 | D4 | 15 | ABSENCE | 0 |
| EXAMPLE 41 | PRESENCE | 5.0 | 1.3 | 30 | D4 | 15 | E3 | 5 |

TABLE 7-2

| | BASESHEET | | | | | | COLOR FILM LAYER | | |
|---|---|---|---|---|---|---|---|---|---|
| | | TOTAL PLATING WEIGHT ON BOTH SIDES | | SURFACE SHAPE | | | | | |
| | | | | | | AREA | | | |
| | TYPE | ($g/m^2$) | WORKING METHOD | AREA OF FIRST REGION (%) | AREA OF SECOND REGION (%) | RATIO OF FIRST/ SECOND REGIONS | CHEMICAL TREAT-MENT | FILM THICK-NESS (μm) | TYPE OF BINDER RESIN | TYPE OF PARTICLE |
| EXAMPLE 42 | A1 | 100 | A | 50 | 50 | 1.0 | PRESENCE | 4.0 | B4 | C2 |
| EXAMPLE 43 | A1 | 100 | A | 50 | 50 | 1.0 | PRESENCE | 4.0 | B4 | C2 |
| EXAMPLE 44 | A1 | 100 | A | 50 | 50 | 1.0 | PRESENCE | 4.0 | B1 | C10 |
| EXAMPLE 45 | A1 | 100 | A | 50 | 50 | 1.0 | PRESENCE | 2.0 | B1 | C14 |
| EXAMPLE 46 | A1 | 100 | A | 50 | 50 | 1.0 | PRESENCE | 4.0 | B1 | C15 |
| EXAMPLE 47 | A1 | 100 | A | 50 | 50 | 1.0 | PRESENCE | 4.0 | B1 | C16 |
| EXAMPLE 48 | A1 | 100 | A | 50 | 50 | 1.0 | PRESENCE | 4.0 | B1 | C17 |
| EXAMPLE 49 | A1 | 100 | A | 50 | 50 | 1.0 | PRESENCE | 10.0 | B1 | C9 |
| EXAMPLE 50 | A1 | 100 | A | 50 | 50 | 1.0 | PRESENCE | 7.0 | B1 | C9 |
| EXAMPLE 51 | A1 | 100 | A | 50 | 50 | 1.0 | PRESENCE | 5.0 | B1 | C11 |
| EXAMPLE 52 | A1 | 100 | A | 50 | 50 | 1.0 | PRESENCE | 4.0 | B1 | C11 |
| EXAMPLE 53 | A1 | 100 | A | 50 | 50 | 1.0 | PRESENCE | 1.0 | B1 | C7 |
| EXAMPLE 54 | A1 | 100 | A | 50 | 50 | 1.0 | PRESENCE | 1.0 | B1 | C8 |
| EXAMPLE 55 | A1 | 100 | A | 50 | 50 | 1.0 | PRESENCE | 10.0 | B1 | C12 |
| EXAMPLE 56 | A1 | 100 | A | 50 | 50 | 1.0 | PRESENCE | 10.0 | B1 | C13 |
| EXAMPLE 57 | A1 | 100 | A | 50 | 50 | 1.0 | PRESENCE | 4.0 | B1 | C2 |
| EXAMPLE 58 | A1 | 100 | A | 50 | 50 | 1.0 | PRESENCE | 10.0 | B1 | C4 |
| EXAMPLE 59 | A1 | 100 | A | 50 | 50 | 1.0 | PRESENCE | 10.0 | B1 | C5 |
| EXAMPLE 60 | A1 | 100 | A | 50 | 50 | 1.0 | PRESENCE | 4.0 | B1 | C3 |
| EXAMPLE 61 | A1 | 100 | A | 50 | 50 | 1.0 | PRESENCE | 4.0 | B1 | C3 |
| EXAMPLE 62 | A1 | 100 | A | 50 | 50 | 1.0 | PRESENCE | 4.0 | B1 | C3 |
| EXAMPLE 63 | A1 | 100 | A | 50 | 50 | 1.0 | PRESENCE | 4.0 | B1 | C3 |
| EXAMPLE 64 | A1 | 100 | A | 50 | 50 | 1.0 | PRESENCE | 4.0 | B1 | C3 |
| EXAMPLE 65 | A1 | 100 | A | 50 | 50 | 1.0 | PRESENCE | 4.0 | B1 | C3 |

TABLE 7-2-continued

| | | | | | | | | | | |
|---|---|---|---|---|---|---|---|---|---|---|
| EXAMPLE 66 | A1 | 100 | A | 50 | 50 | 1.0 | PRESENCE | 4.0 | B1 | C3 |
| EXAMPLE 67 | A1 | 100 | A | 50 | 50 | 1.0 | PRESENCE | 4.0 | B1 | C3 |
| EXAMPLE 68 | A1 | 100 | A | 50 | 50 | 1.0 | PRESENCE | 4.0 | B1 | C3 |
| EXAMPLE 69 | A1 | 100 | A | 50 | 50 | 1.0 | PRESENCE | 4.0 | B1 | C3 |
| EXAMPLE 70 | A1 | 100 | A | 50 | 50 | 1.0 | PRESENCE | 4.0 | B1 | C3 |
| EXAMPLE 71 | A1 | 100 | A | 50 | 50 | 1.0 | PRESENCE | 4.0 | B1 | C3 |
| EXAMPLE 72 | A1 | 100 | A | 50 | 50 | 1.0 | PRESENCE | 4.0 | B1 | C3 |
| EXAMPLE 73 | A1 | 100 | A | 50 | 50 | 1.0 | PRESENCE | 4.0 | B1 | C3 |
| EXAMPLE 74 | A1 | 100 | A | 50 | 50 | 1.0 | PRESENCE | 4.0 | B1 | C3 |
| EXAMPLE 75 | A1 | 100 | A | 50 | 50 | 1.0 | PRESENCE | 4.0 | B1 | C3 |
| EXAMPLE 76 | A1 | 100 | A | 50 | 50 | 1.0 | PRESENCE | 4.0 | B1 | C2 |
| COMPARATIVE EXAMPLE 1 | A1 | 100 | M | 0 | 100 | 0.0 | PRESENCE | 4.0 | B1 | C3 |
| COMPARATIVE EXAMPLE 2 | A1 | 100 | G | 100 | 0 | — | PRESENCE | 4.0 | B1 | C3 |
| COMPARATIVE EXAMPLE 3 | A1 | 100 | A | 50 | 50 | 1.0 | PRESENCE | 0.5 | B1 | C1 |
| COMPARATIVE EXAMPLE 4 | A1 | 100 | A | 50 | 50 | 1.0 | PRESENCE | 12.0 | B1 | C4 |
| COMPARATIVE EXAMPLE 5 | A1 | 100 | A | 50 | 50 | 1.0 | PRESENCE | 2.0 | B1 | C6 |

| | COLOR FILM LAYER | | | | | | | |
|---|---|---|---|---|---|---|---|---|
| | PARTICLE HAVING DIAMETER EQUAL TO OR LARGER THAN FILM THICKNESS | AVERAGE PARTICLE DIAMETER (μm) | AVERAGE PARTICLE DIAMETER/ FILM THICKNESS | CONTENT OF PARTICLE (MASS %) | COLOR PIGMENT | AMOUNT OF COLOR PIGMENT (MASS %) | RUST PREVENTIVE PIGMENT | AMOUNT OF RUST PREVENTIVE PIGMENT (MASS %) |
| EXAMPLE 42 | PRESENCE | 5.0 | 1.3 | 30 | D4 | 15 | ABSENCE | 0 |
| EXAMPLE 43 | PRESENCE | 5.0 | 1.3 | 30 | D4 | 15 | E3 | 5 |
| EXAMPLE 44 | PRESENCE | 9.5 | 2.4 | 30 | D4 | 15 | ABSENCE | 0 |
| EXAMPLE 45 | PRESENCE | 2.0 | 1.0 | 30 | D4 | 15 | ABSENCE | 0 |
| EXAMPLE 46 | PRESENCE | 8.0 | 2.0 | 30 | D4 | 15 | ABSENCE | 0 |
| EXAMPLE 47 | PRESENCE | 8.0 | 2.0 | 30 | D2 | 40 | ABSENCE | 0 |
| EXAMPLE 48 | PRESENCE | 8.0 | 2.0 | 30 | D3 | 5 | ABSENCE | 0 |
| EXAMPLE 49 | PRESENCE | 2.2 | 0.2 | 30 | D4 | 15 | ABSENCE | 0 |
| EXAMPLE 50 | PRESENCE | 2.2 | 0.3 | 30 | D4 | 15 | ABSENCE | 0 |
| EXAMPLE 51 | PRESENCE | 12.0 | 2.4 | 30 | D4 | 15 | ABSENCE | 0 |
| EXAMPLE 52 | PRESENCE | 12.0 | 3.0 | 30 | D4 | 15 | ABSENCE | 0 |
| EXAMPLE 53 | PRESENCE | 0.6 | 0.6 | 30 | D4 | 15 | ABSENCE | 0 |
| EXAMPLE 54 | PRESENCE | 1.0 | 1.0 | 30 | D4 | 15 | ABSENCE | 0 |
| EXAMPLE 55 | PRESENCE | 15.2 | 1.5 | 30 | D4 | 15 | ABSENCE | 0 |
| EXAMPLE 56 | PRESENCE | 17.0 | 1.7 | 30 | D4 | 15 | ABSENCE | 0 |
| EXAMPLE 57 | PRESENCE | 5.0 | 1.3 | 30 | D4 | 15 | ABSENCE | 0 |
| EXAMPLE 58 | PRESENCE | 10.0 | 1.0 | 30 | D4 | 15 | ABSENCE | 0 |
| EXAMPLE 59 | PRESENCE | 12.0 | 1.2 | 30 | D4 | 15 | ABSENCE | 0 |
| EXAMPLE 60 | PRESENCE | 8.0 | 2.0 | 3 | D4 | 15 | ABSENCE | 0 |
| EXAMPLE 61 | PRESENCE | 8.0 | 2.0 | 5 | D4 | 15 | ABSENCE | 0 |
| EXAMPLE 62 | PRESENCE | 8.0 | 2.0 | 10 | D4 | 15 | ABSENCE | 0 |
| EXAMPLE 63 | PRESENCE | 8.0 | 2.0 | 45 | D4 | 15 | ABSENCE | 0 |
| EXAMPLE 64 | PRESENCE | 8.0 | 2.0 | 50 | D4 | 15 | ABSENCE | 0 |
| EXAMPLE 65 | PRESENCE | 8.0 | 2.0 | 55 | D4 | 15 | ABSENCE | 0 |
| EXAMPLE 66 | PRESENCE | 8.0 | 2.0 | 30 | ABSENCE | 0 | ABSENCE | 0 |
| EXAMPLE 67 | PRESENCE | 8.0 | 2.0 | 30 | D5 | 5 | ABSENCE | 0 |
| EXAMPLE 68 | PRESENCE | 8.0 | 2.0 | 30 | D1 | 20 | ABSENCE | 0 |
| EXAMPLE 69 | PRESENCE | 8.0 | 2.0 | 30 | D2 | 40 | ABSENCE | 0 |
| EXAMPLE 70 | PRESENCE | 8.0 | 2.0 | 30 | D3 | 5 | ABSENCE | 0 |
| EXAMPLE 71 | PRESENCE | 8.0 | 2.0 | 30 | D4 | 15 | E1 | 5 |
| EXAMPLE 72 | PRESENCE | 8.0 | 2.0 | 30 | D4 | 15 | E2 | 5 |
| EXAMPLE 73 | PRESENCE | 8.0 | 2.0 | 30 | D4 | 15 | E3 | 1 |
| EXAMPLE 74 | PRESENCE | 8.0 | 2.0 | 30 | D4 | 15 | E3 | 5 |
| EXAMPLE 75 | PRESENCE | 8.0 | 2.0 | 30 | D4 | 15 | E3 | 15 |
| EXAMPLE 76 | PRESENCE | 5.0 | 1.3 | 30 | D4 | 15 | E3 | 5 |
| COMPARATIVE EXAMPLE 1 | PRESENCE | 8.0 | 2.0 | 30 | D4 | 15 | ABSENCE | 0 |
| COMPARATIVE EXAMPLE 2 | PRESENCE | 8.0 | 2.0 | 30 | D4 | 15 | ABSENCE | 0 |
| COMPARATIVE EXAMPLE 3 | PRESENCE | 1.0 | 2.0 | 30 | D4 | 15 | ABSENCE | 0 |
| COMPARATIVE EXAMPLE 4 | PRESENCE | 10.0 | 0.8 | 30 | D4 | 15 | ABSENCE | 0 |
| COMPARATIVE EXAMPLE 5 | ABSENCE | 0.5 | 0.3 | 30 | D4 | 15 | ABSENCE | 0 |

(4) Evaluation of Sample

Regarding each of the samples produced by the above-described method, performance was evaluated based on criteria as follows. The obtained evaluation results were presented collectively in Table 8-1 and Table 8-2 below.

<External Appearance>

External appearances of the produced samples were evaluated on the following criteria, and scores of two or more were each set as an acceptance, and a score of one was set as a failure.

Evaluation Criteria
3: On an evaluation surface, an external appearance of a uniform color film is 95% or more.
2: On an evaluation surface, an external appearance of a uniform color film is 80% or more and less than 95%.
1: Due to the occurrence of solvent popping, or the like, on an evaluation surface, an external appearance of a uniform color film is less than 80%.

<Surface Contact Flaw Resistance>

Surface contact flaw resistance was evaluated by a method as follows. The produced samples were each cut into 50 mm square and fixed with a painted surface facing up. After superposing an electrogalvanized steel sheet cut into 50 mm square on each of the samples, and turning them 90 degrees in a state of being pressurized under the condition of 8.5 kgf/cm$^2$ (1 kgf is about 9.8 N.), states of the painted surfaces were evaluated by criteria as follows, and scores of three or more were each set as an acceptance.

Evaluation Criteria
7: paint film peeling or a gloss change due to pressurization is hardly observed.
   (peeling from a contact portion is less than 2%)
6: paint film peeling is hardly observed, but a gloss change due to pressurization is partly observed.
   (peeling from a contact portion is less than 2%)
5: very slight paint film peeling is observed, and a gloss change due to pressurization is partly observed.
   (peeling from a contact portion is 2% or more and less than 5%)
4: slight paint film peeling is observed, and a gloss change due to pressurization is partly observed.
   (peeling from a contact portion is 5% or more and less than 10%)
3: slight paint film peeling is observed, and a gloss change due to pressurization is observed.
   (peeling from a contact portion is 5% or more and less than 10%)
2: paint film peeling is observed, and a remarkable gloss change due to pressurization is observed.
   (peeling from a contact portion is 10% or more and less than 20%)
1: paint film peeling is significant.
   (peeling from a contact portion is 20% or more)

<Worked Portion Adhesion>

As reference performance, worked portion adhesion was evaluated based on criteria as follows. On the produced samples, after performing 90° bending under the condition of inside R 1 in an atmosphere of 20° C., a tape peeling test on an outer side of a bent portion was conducted. External appearances of tape peeled portions were evaluated by the following evaluation criteria.

Evaluation Criteria
4: paint film peeling is hardly observed (a peeling area from a bent portion is less than 2%).
3: slight paint film peeling is observed (a peeling area from a bent portion is 2% or more and less than 5%).
2: partial paint film peeling is observed (a peeling area from a bent portion is 5% or more and less than 20%).
1: overall paint film peeling is observed (a peeling area from a bent portion is 20% or more).

<Corrosion Resistance>

As reference performance, corrosion resistance was evaluated based on criteria as follows. After sealing an end face of each of test sheets with a tape, a salt spray test (SST) in conformity with JIS Z 2371 was conducted for 72 hours, and states of rust formation were observed to be evaluated by the following evaluation criteria.

Evaluation Criteria
6: an area of white rust formation is less than 1%, and no red rust formation.
5: an area of rust formation is 1% or more and less than 2%, and no red rust formation.
4: an area of rust formation is 2% or more and less than 3%, and no red rust formation.
3: an area of rust formation is 3% or more and less than 4%, and no red rust formation.
2: an area of rust formation is 4% or more and less than 5%, and no red rust formation.
1: an area of rust formation is 5% or more, or red rust formation.

TABLE 8-1

|  | EXTERNAL APPEARANCE | SURFACE CONTACT FLAW RESISTANCE | WORKED PORTION ADHESION | CORROSION RESISTANCE |
| --- | --- | --- | --- | --- |
| EXAMPLE 1 | 3 | 7 | 4 | 5 |
| EXAMPLE 2 | 3 | 7 | 4 | 4 |
| EXAMPLE 3 | 3 | 7 | 4 | 4 |
| EXAMPLE 4 | 3 | 7 | 4 | 4 |
| EXAMPLE 5 | 3 | 7 | 4 | 6 |
| EXAMPLE 6 | 3 | 7 | 4 | 4 |
| EXAMPLE 7 | 3 | 7 | 4 | 1 |
| EXAMPLE 8 | 3 | 7 | 4 | 2 |
| EXAMPLE 9 | 3 | 7 | 4 | 5 |
| EXAMPLE 10 | 3 | 7 | 4 | 5 |
| EXAMPLE 11 | 3 | 7 | 4 | 5 |
| EXAMPLE 12 | 2 | 7 | 4 | 5 |
| EXAMPLE 13 | 3 | 7 | 4 | 2 |
| EXAMPLE 14 | 3 | 7 | 4 | 3 |
| EXAMPLE 15 | 3 | 7 | 4 | 4 |
| EXAMPLE 16 | 3 | 7 | 4 | 4 |
| EXAMPLE 17 | 3 | 7 | 4 | 4 |
| EXAMPLE 18 | 3 | 7 | 4 | 5 |
| EXAMPLE 19 | 3 | 6 | 4 | 5 |

TABLE 8-1-continued

|  | EXTERNAL APPEARANCE | SURFACE CONTACT FLAW RESISTANCE | WORKED PORTION ADHESION | CORROSION RESISTANCE |
|---|---|---|---|---|
| EXAMPLE 20 | 3 | 5 | 4 | 5 |
| EXAMPLE 21 | 3 | 4 | 4 | 5 |
| EXAMPLE 22 | 3 | 3 | 4 | 5 |
| EXAMPLE 23 | 3 | 7 | 4 | 5 |
| EXAMPLE 24 | 3 | 7 | 4 | 5 |
| EXAMPLE 25 | 3 | 7 | 4 | 4 |
| EXAMPLE 26 | 3 | 7 | 4 | 5 |
| EXAMPLE 27 | 3 | 7 | 4 | 5 |
| EXAMPLE 28 | 3 | 7 | 4 | 5 |
| EXAMPLE 29 | 3 | 7 | 4 | 5 |
| EXAMPLE 30 | 3 | 6 | 4 | 5 |
| EXAMPLE 31 | 3 | 5 | 4 | 4 |
| EXAMPLE 32 | 3 | 7 | 3 | 5 |
| EXAMPLE 33 | 3 | 7 | 4 | 6 |
| EXAMPLE 34 | 3 | 7 | 3 | 5 |
| EXAMPLE 35 | 3 | 7 | 3 | 6 |
| EXAMPLE 36 | 3 | 7 | 4 | 5 |
| EXAMPLE 37 | 3 | 7 | 4 | 6 |
| EXAMPLE 38 | 3 | 7 | 4 | 5 |
| EXAMPLE 39 | 3 | 7 | 4 | 6 |
| EXAMPLE 40 | 3 | 7 | 3 | 5 |
| EXAMPLE 41 | 3 | 7 | 3 | 6 |

TABLE 8-2

|  | EXTERNAL APPEARANCE | SURFACE CONTACT FLAW RESISTANCE | WORKED PORTION ADHESION | CORROSION RESISTANCE |
|---|---|---|---|---|
| EXAMPLE 42 | 3 | 7 | 4 | 5 |
| EXAMPLE 43 | 3 | 7 | 4 | 6 |
| EXAMPLE 44 | 3 | 4 | 2 | 5 |
| EXAMPLE 45 | 3 | 4 | 3 | 6 |
| EXAMPLE 46 | 3 | 4 | 3 | 5 |
| EXAMPLE 47 | 3 | 4 | 2 | 5 |
| EXAMPLE 48 | 3 | 3 | 2 | 5 |
| EXAMPLE 49 | 3 | 3 | 3 | 5 |
| EXAMPLE 50 | 3 | 4 | 3 | 5 |
| EXAMPLE 51 | 3 | 4 | 3 | 5 |
| EXAMPLE 52 | 3 | 3 | 2 | 5 |
| EXAMPLE 53 | 3 | 3 | 3 | 4 |
| EXAMPLE 54 | 3 | 4 | 3 | 4 |
| EXAMPLE 55 | 3 | 4 | 3 | 5 |
| EXAMPLE 56 | 3 | 3 | 2 | 5 |
| EXAMPLE 57 | 3 | 7 | 4 | 5 |
| EXAMPLE 58 | 3 | 7 | 4 | 5 |
| EXAMPLE 59 | 3 | 7 | 4 | 5 |
| EXAMPLE 60 | 3 | 3 | 4 | 5 |
| EXAMPLE 61 | 3 | 5 | 4 | 5 |
| EXAMPLE 62 | 3 | 7 | 4 | 5 |
| EXAMPLE 63 | 3 | 7 | 4 | 5 |
| EXAMPLE 64 | 3 | 5 | 4 | 4 |
| EXAMPLE 65 | 3 | 4 | 3 | 3 |
| EXAMPLE 66 | 3 | 7 | 4 | 5 |
| EXAMPLE 67 | 3 | 7 | 4 | 5 |
| EXAMPLE 68 | 3 | 7 | 4 | 5 |
| EXAMPLE 69 | 3 | 7 | 4 | 5 |
| EXAMPLE 70 | 3 | 7 | 4 | 5 |
| EXAMPLE 71 | 3 | 7 | 4 | 6 |
| EXAMPLE 72 | 3 | 7 | 4 | 6 |
| EXAMPLE 73 | 3 | 7 | 4 | 6 |
| EXAMPLE 74 | 3 | 7 | 4 | 6 |
| EXAMPLE 75 | 3 | 7 | 4 | 6 |
| EXAMPLE 76 | 3 | 7 | 4 | 6 |
| COMPARATIVE EXAMPLE 1 | 3 | 2 | 4 | 5 |
| COMPARATIVE EXAMPLE 2 | 3 | 2 | 4 | 2 |
| COMPARATIVE EXAMPLE 3 | 3 | 2 | 4 | 4 |

TABLE 8-2-continued

|  | EXTERNAL APPEARANCE | SURFACE CONTACT FLAW RESISTANCE | WORKED PORTION ADHESION | CORROSION RESISTANCE |
|---|---|---|---|---|
| COMPARATIVE EXAMPLE 4 | 1 | 2 | 1 | 4 |
| COMPARATIVE EXAMPLE 5 | 3 | 1 | 3 | 5 |

As is obvious from Table 8-1 and Table 8-2 described above, the pre-coated metal sheets corresponding to the examples of the present invention are each found to combine an excellent external appearance and surface contact flaw resistance. On the other hand, the pre-coated metal sheets corresponding to the comparative examples of the present invention are each found to be poor in performance of at least either the external appearance or the surface contact flaw resistance.

The preferred embodiments of the present invention have been described in detail above with reference to the attached drawings, but the present invention is not limited to such examples. It is apparent that a person having common knowledge in the technical field to which the present invention belongs is able to devise various variation or modification examples within the range of technical ideas described in the claims, and it should be understood that such examples belong to the technical scope of the present invention as a matter of course.

EXPLANATION OF CODES 1 pre-coated metal sheet
10 metal sheet
20 color film layer
30 chemical treatment film layer
201 film-forming component
203 particle

What is claimed is:

1. A pre-coated metal sheet comprising:
a metal sheet; and
a color film layer positioned on the metal sheet, wherein:
on a surface of the metal sheet, on a side on which at least the color film layer is positioned, a first region and a second region that are specified by a following measuring method of an arithmetic mean surface roughness Sa are present: and
the color film layer has a thickness of 1 to 10 μm, and contains particles having a particle diameter equal to or larger than the thickness, wherein the method of measuring arithmetic mean surface roughness Sa is as follows:
on the surface of the metal sheet, virtual grid lines are set at intervals of 0.5 mm, and in each of a plurality of regions into which the surface is divided by the virtual grid lines, the arithmetic mean surface roughness Sa specified by ISO 25178 is measured, the region in which the obtained arithmetic mean surface roughness Sa is 1 μm or more is set as the first region, and the region in which the obtained arithmetic mean surface roughness Sa is less than 1 μm is set as the second region.

2. The pre-coated metal sheet according to claim 1, wherein an area ratio of the first region to the surface of the metal sheet is 10 to 90% per side.

3. The pre-coated metal sheet according to claim 1, wherein a ratio of the area ratio of the first region to an area ratio of the second region is 0.3 to 3.0.

4. The pre-coated metal sheet according to claim 1, wherein a content of the particles in the color film layer is 5 to 50 mass % with respect to a total content of a film-forming component and the particles of the color film layer.

5. The pre-coated metal sheet according to claim 1, wherein an average particle diameter of the particles is 1 to 15 μm.

6. The pre-coated metal sheet according to claim 1, wherein the average particle diameter of the particles is 0.3 to 2.5 times the thickness of the color film layer.

7. The pre-coated metal sheet according to claim 1, wherein the particle is at least either an inorganic particle of at least any of silica, ceramic, and a metallic compound, or, a resin particle.

8. The pre-coated metal sheet according to claim 1, wherein the particle is an acrylic-based resin particle.

9. The pre-coated metal sheet according to claim 1, wherein the metal sheet is an aluminum sheet, a zinc sheet, a stainless sheet, a titanium sheet, or a steel sheet.

10. The pre-coated metal sheet according to claim 1, wherein the metal sheet is a plated steel sheet in which a plating layer is provided on a surface.

11. The pre-coated metal sheet according to claim 10, wherein the plated steel sheet is a zinc-based plated steel sheet.

12. The pre-coated metal sheet according to claim 10, wherein the plating layer is a plating layer containing Al: 4 to 22 mass %, Mg: 1 to 10 mass %, Si: 0.0001 to 2.0000 mass %, and the balance comprising Zn and impurities.

13. The pre-coated metal sheet according to claim 10, wherein a weight of the plating layer is 30 to 600 g/m$^2$ in total on both sides of the steel sheet.

14. The pre-coated metal sheet according to claim 1, wherein the color film layer contains at least any of an aluminum pigment, carbon black, and $TiO_2$ as a color pigment.

15. The pre-coated metal sheet according to claim 1, wherein the color film layer further contains a rust preventive pigment.

16. The pre-coated metal sheet according to claim 1, further comprising a chemical treatment film layer between the metal sheet and the color film layer.

* * * * *